(12) United States Patent
Pinto et al.

(10) Patent No.: US 8,714,556 B2
(45) Date of Patent: May 6, 2014

(54) PUMP SEAL

(75) Inventors: Pradeep Pinto, Chicago, IL (US); John Baibak, Aurora, IL (US); Michael Kroha, Chicago, IL (US)

(73) Assignee: Flowserve Management Company, Irving, TX (US)

( * ) Notice: Subject to any disclaimer, the term of this patent is extended or adjusted under 35 U.S.C. 154(b) by 275 days.

(21) Appl. No.: 12/653,328

(22) Filed: Dec. 11, 2009

(65) Prior Publication Data

US 2010/0148448 A1 Jun. 17, 2010

Related U.S. Application Data

(60) Provisional application No. 61/122,127, filed on Dec. 12, 2008, provisional application No. 61/217,330, filed on May 29, 2009.

(51) Int. Cl.
*F16J 15/34* (2006.01)

(52) U.S. Cl.
CPC .................................. *F16J 15/3464* (2013.01)
USPC ......................................................... 277/371

(58) Field of Classification Search
USPC ................................................ 277/370–373
See application file for complete search history.

(56) References Cited

U.S. PATENT DOCUMENTS

| | | | |
|---|---|---|---|
| 3,511,513 A | 5/1970 | Dahlheimer | |
| 3,652,183 A | 3/1972 | Pottharst, Jr. | |
| 3,764,148 A | 10/1973 | Mullaney | |
| 3,887,200 A * | 6/1975 | Engelking et al. | 277/385 |
| 4,256,313 A | 3/1981 | Arnold | |
| 4,278,218 A * | 7/1981 | Uhrner | 277/393 |
| 4,304,407 A | 12/1981 | Ashe | |
| 4,304,408 A * | 12/1981 | Greenawalt | 277/373 |
| 4,332,391 A | 6/1982 | Arnold | |
| 4,389,051 A * | 6/1983 | Mullaney | 277/373 |
| 4,415,167 A | 11/1983 | Gits | |
| 4,779,876 A * | 10/1988 | Novosad | 277/397 |
| 4,854,598 A | 8/1989 | Deuring | |
| 5,123,660 A * | 6/1992 | Dahlheimer et al. | 277/393 |
| 5,340,121 A * | 8/1994 | Lewis et al. | 277/393 |
| 5,797,602 A | 8/1998 | Less | |
| 5,893,564 A | 4/1999 | Yang | |
| 6,145,841 A | 11/2000 | Maeda | |

(Continued)

FOREIGN PATENT DOCUMENTS

GB 946 534 1/1964

*Primary Examiner* — Vishal Patel
(74) *Attorney, Agent, or Firm* — Miller, Canfield, Paddock and Stone; Mark L Maki

(57) ABSTRACT

A pump seal for sealing a gap between a housing and a rotating shaft including a first shell configured to engage the pump housing and to be stationary therewith. The first shell is provided with a first wearable sealing element. The pump seal further includes a second shell configured to engage the shaft and to rotate therewith, the second shell being provided with a second wearable sealing element. The first and second wearable sealing elements are configured to be in substantially sealing contact with each other during operation. The pump seal further includes a sintered retainer ring arranged between a portion of the first shell and the first wearable sealing element for substantially preventing rotation of the first wearable sealing element relative to the first shell.

11 Claims, 5 Drawing Sheets

(56) References Cited

U.S. PATENT DOCUMENTS

| | | |
|---|---|---|
| 6,325,330 B1 | 12/2001 | Lavan |
| 6,398,223 B1 * | 6/2002 | Radosav .................. 277/352 |
| 6,460,858 B1 | 10/2002 | Kitajima et al. |
| 6,550,779 B2 | 4/2003 | Bjornson |
| 6,568,687 B2 | 5/2003 | Radosav |
| 6,688,602 B2 | 2/2004 | Yamada et al. |
| 2007/0108705 A1 | 5/2007 | Dahlheimer |
| 2007/0290450 A1 | 12/2007 | Uhrner et al. |

* cited by examiner

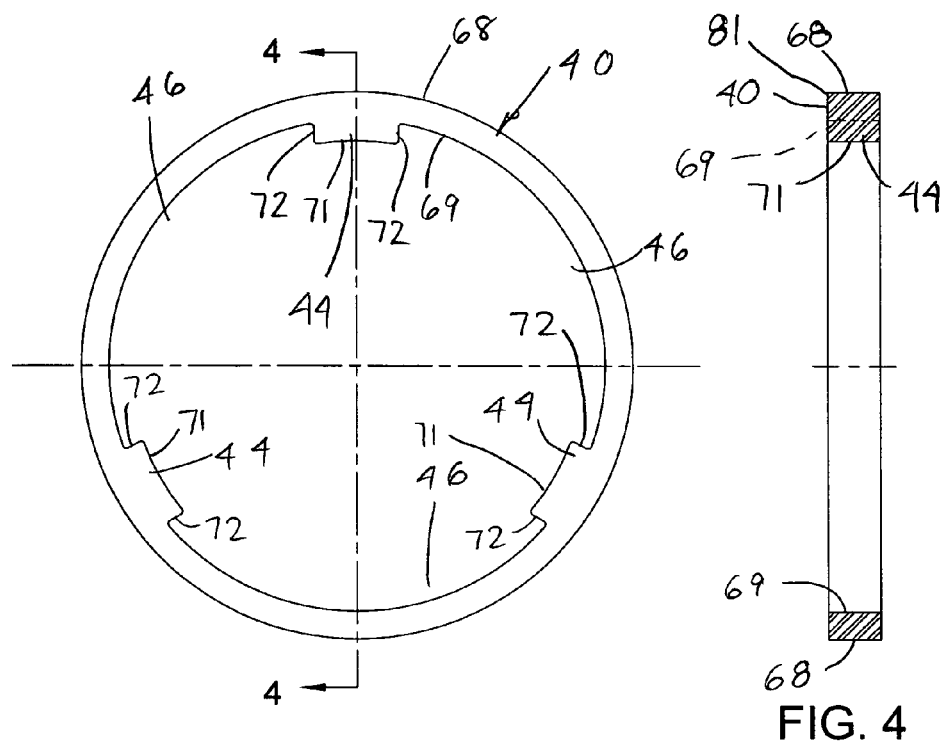
FIG. 3
FIG. 4
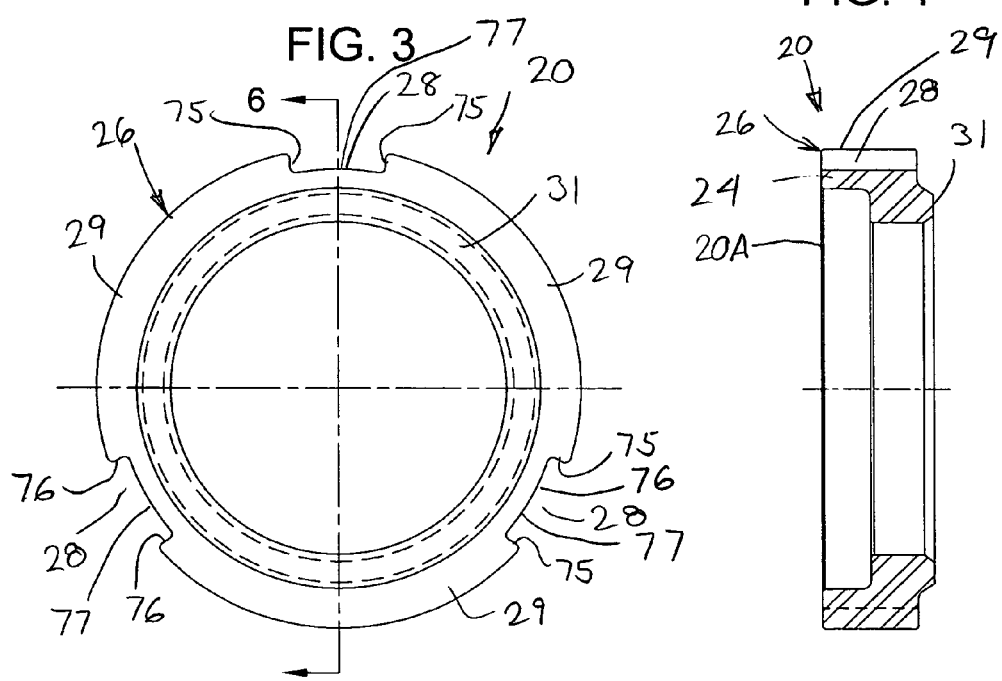
FIG. 5
FIG. 6

PUMP SEAL

CROSS REFERENCE TO RELATED APPLICATIONS

This application claims the benefit of U.S. Provisional Application Ser. No. 61/122,127, filed Dec. 12, 2008, and U.S. Provisional Application Ser. No. 61/217,330, filed May 29, 2009, both of which are incorporated herein by reference in their entirety.

FIELD OF THE INVENTION

The current disclosure relates to a pump seal and a method of manufacturing thereof, and more particularly, to a mechanical seal which has relatively rotatable seal rings for sealing of a rotating shaft of a pump to prevent leakage of process fluid along the shaft.

BACKGROUND OF THE INVENTION

Pump seals and in particular pump seals for coolant pumps as used in internal combustion engines are used to seal gaps between a rotating shaft and a stationary housing. Such seals are often exposed to large numbers of cycles, heat, vibration, aggressive coolant constituents and debris.

Various designs are known in the art, but currently suffer from being complex to manufacture, expensive or simply not robust enough.

More particularly, mechanical seals have been provided for use with water pumps of heavy duty engines, such as a diesel engine for a truck or other vehicles wherein the mechanical seals for such vehicles preferably are compact and low cost mechanical seals. While mechanical seals of the contacting face type are widely used in many different industries, and are provided in a wide range of sizes, typically mechanical seals used for more complex and large-scale applications, such as industrial pumps, compressors and mixers used in various industrial applications, have a relatively substantial size and a relatively complex construction so as to be capable of use in such industrial applications. These types of mechanical seals used in industrial applications are designed for high-speed revolutions by an equipment shaft such as the shaft of a pump or compressor which is driven by an electrical motor. These types of mechanical seals use relatively rotatable seal rings wherein one comprises a stator typically mounted on an equipment housing, and the second one comprises a rotor which mounts to the shaft, and wherein the contacting, opposed faces of the seal rings define a seal ring region extending radially across the ring faces. However, these mechanical seals as used in industrial applications have relatively large sizes, mounting structure and attendant costs which make such mechanical seals unsuitable for smaller scale applications such as the shaft of a coolant pump/water pump of an internal combustion engine.

It is also known to provide compact and relatively inexpensive mechanical seals that are used for sealing the rotary pump associated with the coolant circulation system of an engine such as a diesel engine and particularly a diesel engine as used on heavy-duty vehicles such as trucks. An example of one such mechanical seal is disclosed in U.S. Pat. No. 5,797,602 (Less).

In a coolant circulation system for a diesel engine, such mechanical seals effect sealing between the pump casing and the rotating drive shaft that is drivingly connected to a pump impeller. In such applications, a coolant circulation system has the pump, which is provided with inlet and outlet passages, respectively, for supplying and discharging liquid coolant to and from the interior of the pump casing. The pump casing has a conventional pumping impeller which is rotatable within the pump casing and drivingly connected to the drive shaft which rotates the impeller about the longitudinal shaft axis. The drive shaft typically is driven from the diesel engine wherein the shaft projects outwardly through a housing section that defines a chamber commonly referred to as a pump bore or stuffing box. It is known to provide a mechanical seal such as the known mechanical seal of the Less '602 patent within the pump bore for preventing leakage of fluid being pumped within the pump casing along the shaft.

In these known mechanical seals, such as that disclosed in the Less '602 patent, the mechanical seal typically includes a pair of annular seal rings which are disposed concentrically in surrounding relationship to the shaft wherein the seal rings have respective annular and generally flat seal faces formed on opposed axial end faces thereof, which seal faces are normally maintained in relatively rotatable sealing contact with one another. One seal ring is typically mounted as the rotating ring or rotor to the shaft by a shaft sleeve and rotates therewith. The other seal ring is non-rotatably supported within an annular shell, which shell is non-rotatably engaged within the pump bore such that the second seal ring serves as a stator that sealingly contacts the rotor or rotating seal ring.

To non-rotatably engage the stationary seal ring to the support shell in the Less '602 patent, an annular sleeve projects forwardly from the pump bore in cantilevered relation therewith and surrounds the seal ring wherein a hexagonal configuration of the sleeve prevents rotation of the stator relative thereto. This design, however, has the sleeve cantilevered forwardly from the shell and has a thin-wall construction so as to still be subject to the substantial torsional vibrations encountered in water pump applications of this type.

A mechanical seal design similar to the '602 patent also has been in use wherein the components are developed from machined metal but are less cost-effective.

It is an object of the invention to provide an improved mechanical seal, which for example, provides an improved drive configuration between a shell and stationary seal ring.

SUMMARY OF THE INVENTION

In a first aspect there is disclosed a pump seal of the invention for sealing a gap between a housing and a rotating shaft. The pump seal disclosed comprises a first shell configured to engage the pump housing and to be stationary therewith and it is provided with a first wearable sealing element. A second shell is configured to engage the shaft and to rotate therewith, the second shell being provided with a second wearable sealing element. The first and second wearable sealing elements are configured to be in substantially sealing contact with each other during operation. A sintered retainer ring is arranged between a portion of the first shell and the first wearable sealing element for substantially preventing rotation of the first wearable sealing element relative to the first shell.

In a second aspect there is disclosed a method of manufacturing a pump seal, comprising forming a first shell and providing the first shell with a first wearable sealing element. A retainer ring is fitted to the shell via an interference fit thereby engaging at least one projection and indention arrangement formed by the first wearable sealing arrangement and the retainer ring to substantially prevent rotational movement of the first wearable sealing element relative to the first shell.

As to the first aspect, the invention relates to an improved seal configuration wherein the first and second wearable sealing elements are respectively defined by a stationary seal ring supported in a pump bore of the pump housing by a support shell, which defines the first shell, and a rotatable seal ring supported on the rotating shaft by a shaft sleeve, which defines the second shell.

The first shell referenced herein as the support shell is configured for an interference fit, and preferably a press fit into the pump bore, which press fit would effect limited radial distortion of the support shell radially inwardly upon axial pressing of the support shell into the pump bore. This press fit occurs at the time of installation. Prior to installation, the support shell has a positive taper wherein the support shell flares radially outwardly from an inner end to an outer end wherein the magnitude of the outer diameter progressively increases a slight extent from the inner end to the outer end. This taper is referred to as a positive taper reflected by a progressive increase along the axial length of the support shell.

The improved mechanical seal further includes a sintered or shaped metal drive ring which has an annular shape wherein drive lugs project radially inwardly therefrom. The drive ring has a thickness greater than the thin walls of the support shell so as to have a greater rigidity. To initially secure the drive ring in the shell, the drive ring has an outer ring diameter which is smaller than the inner shell diameter at an outer shell end yet is greater than the inner shell diameter at the inner shell end. This permits the drive ring to be press fit or inserted with an interference fit into the interior of the support shell in fixed engagement therewith. Once the drive ring is securely fit into the support shell during initial assembly, the support shell is then press fit into the pump bore during subsequent installation which effects radially inward deformation of the support shell against the drive ring to define two complementary, radially adjacent press fits which fixedly secure the support shell within the pump bore and also fixedly secures the drive ring to the support shell.

The drive lugs on the drive ring engage radially outwardly opening notches that are circumferentially spaced about an outer ring diameter of the stationary seal ring wherein the lugs and notches interfit and prevent circumferential movement or rotation of the stationary seal ring relative to the drive ring during shaft rotation.

The mechanical seal of the invention provides an improved mechanical seal which is particularly suited for high volume manufacturability at a relatively low cost while also providing a robust mechanical seal which readily handles the torsional vibrations encountered in engine applications and particularly those found in diesel engine water pump applications.

Other objects and purposes of the invention, and variations thereof, will be apparent upon reading the following specification and inspecting the accompanying drawings.

BRIEF DESCRIPTION OF THE DRAWINGS

FIG. 3 is an end view of a retainer ring or drive ring.

FIG. 4 is a side cross-sectional view of the drive ring as taken along line 4-4 of FIG. 3.

FIG. 5 is an end view of a stationary seal ring engageable with said drive ring.

FIG. 6 is a side cross-sectional view of the seal ring of FIG. 5 as taken along line 6-6 thereof.

Figure 1:
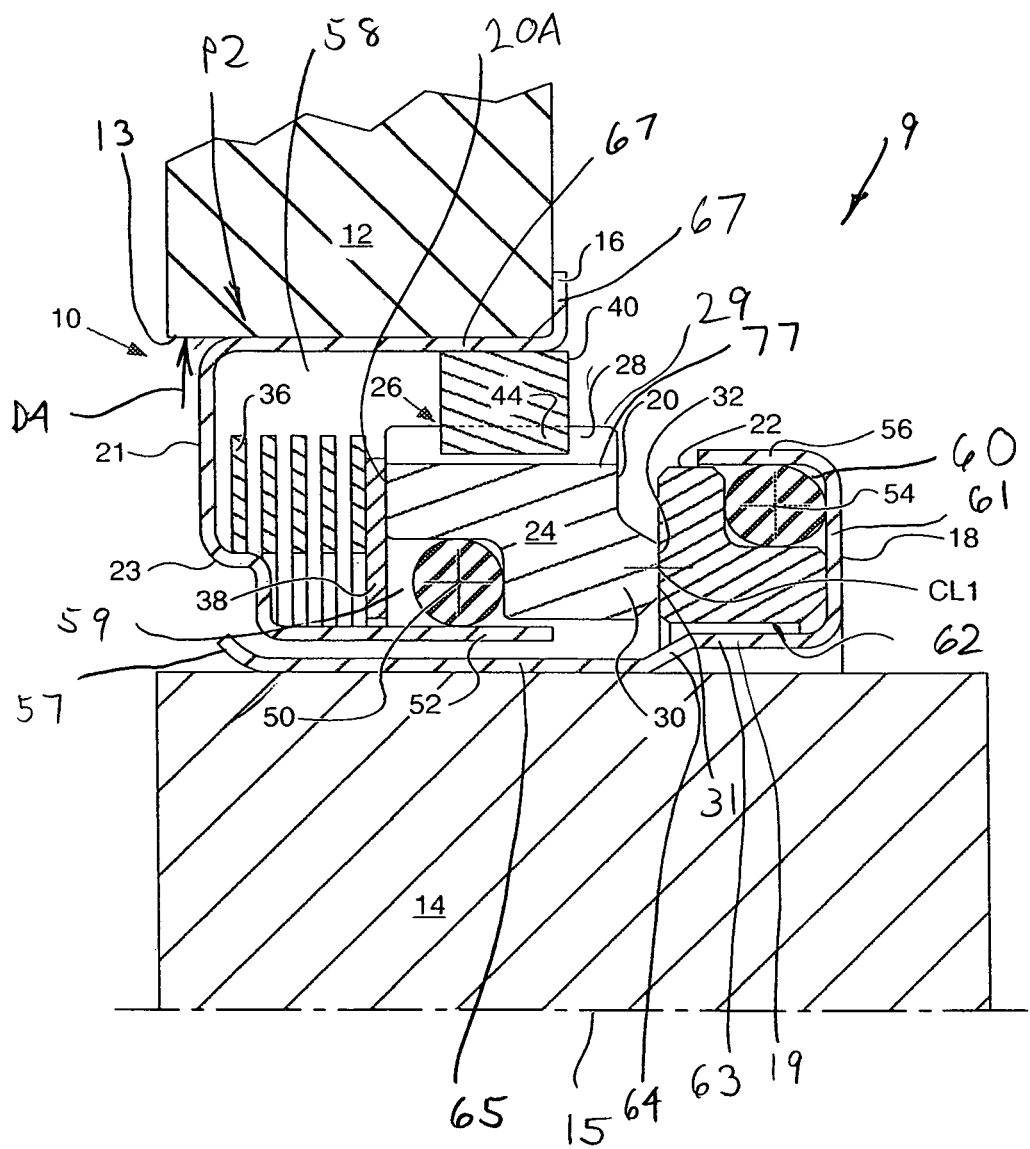
FIG. 1 is a schematical representation of a cross-section of a seal in accordance with the current disclosure.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Now referring to the coolant pump 9 of FIG. 1, there is shown a cross-sectional view of an exemplary embodiment of a pump seal 10, i.e. a mechanical seal for a pump, which is provided for sealing a gap between a pump housing 12 and a pump shaft 14 rotatably mounted in the pump housing 12 so as to be rotatable about shaft axis 15. The pump housing 12 defines a pump bore 13 having an inner diameter which generally corresponds to the particular size of the shaft of the water pump 9 in which the pump seal 10 of the invention is used. It is understood that the coolant of pump 9 as well as the pump seal 10 of the invention are particularly suited and preferably usable in those coolant pumps provided in internal combustion engines, particularly those used in heavy-duty engines for a truck or other vehicle. A detailed disclosure of all of the coolant pump components is not required since coolant pumps are known to the skilled artisan and the structure of which is discussed in greater detail in the above disclosure.

In this exemplary embodiment, the pump seal 10 comprises a first shell 16 serving as a support shell and a second shell 18 serving as a shaft sleeve. Generally, the first shell 16 preferably engages with the pump housing 12 such that it is stationary therewith, preferably via an interference fit like a press-fit. While alternative and/or additional retention methods may be used, such as for example one or more adhesive layers and/or coating layers between mating surfaces of the pump housing 12 and the first shell 16, the interference fit does not require such additional retention methods. The second shell/shaft sleeve 18 engages with the pump shaft 14 such that it is rotatable therewith, such as via for example an interference fit like a shrink-fit. The second shell 18 preferably is provided with a shaped-surface drive arrangement 19 having multiple drive flats described in further detail hereinafter. The drive arrangement 19 may for example be an undulating surface and/or a series of different surface portions adjacent each other. Alternative and/or additional drive methods may be used.

First and second shells 16 and 18 preferably are provided with annular first and second sealing elements 20, 22 respectively, formed as annular seal rings. The first and second sealing elements 20, 22 preferably are configured to be in a substantially sealing contact with each other during operation such that the pump seal 10 is a contacting type mechanical seal. The first and second sealing elements 20, 22 may be wearable sealing elements and both preferably comprise silicon carbide. In one embodiment at least one of the first and second sealing elements 20, 22 may comprise graphite loaded silicon carbide although other seal ring materials may be used. The first sealing element 20 preferably has a generally elongated body 24 wherein a radially outer first portion 26 of the body 24 is provided with at least one radially outward facing indentation or drive notch 28 and at least one radially outward facing projection or land 29 extending circumferentially about the outer ring diameter of the sealing element 20 between a circumferentially spaced pair of said drive notches 28.

It is to be understood that in the context of this disclosure "radial" or "radially" means in a direction or at a distance at a right angle relative to pump shaft 14, or in other words, that direction which amounts to vertical in FIG. 1 which extends radially from the shaft axis 15. Essentially, radially then refers to those directions radiating from the center axis such as shaft axis 15. Conversely "axial" or "axially" means in a direction or at a distance parallel to pump shaft 14 or its axis 15, or in other words, that direction which amounts to horizontal in FIG. 1.

In one embodiment the body 24 may be provided with a generally dual tapered end portion 30 which converges to a generally annular contact surface or seal face 31 for contacting a generally annular contact surface or seal face 32 of the second sealing element 22. The first and second sealing elements 20, 22 define the generally annular contact surfaces or seal faces 31 and 32 which face axially in opposed, contacting relation and extend radially to define an annular sealing region having an annular centerline CL1 represented in FIG. 1 by a dotted cross-hair in the center of the annular contact surface or seal face 31. The pump shaft 14, as described above, has a driven end which is driven by the engine to effect shaft rotation while the opposite drive end connects to an impeller or other equipment component which effects pumping of a coolant fluid through a pump casing. With these contact surfaces or seal faces 31 and 32 being in opposed contacting relation during shaft rotation, the sealing element or seal ring 22 that rotates with the shaft 14 remains in direct contact or with only slight separation from the contact surface or seal face 31 to prevent or at least minimize any leakage between the seal faces 31 and 32 during relative rotation of the sealing elements/seal rings 20, 22.

Generally, the first shell 16 is provided with a retainer or drive ring 40 arranged between a portion of the first shell 16 and the first sealing element 20 for substantially preventing rotation of the first sealing element 20 relative to the first shell 16. In the preferred embodiment the retainer ring 40 is a sintered metallic component, wherein the sintered retainer ring can be made using 304 stainless steel but preferably is made from sintered 410 stainless steel which is more robust. Other ring materials may also be used. In the preferred embodiment the retainer ring 40 is engaged with the first shell 16 via an interference fit and preferably, a press-fit as will be described in greater detail hereinafter. While alternative and/or additional retention methods may be used, such as for example one or more adhesive layers and/or coating layers between mating surfaces of the retainer ring 40 and the first shell 16, direct fitting of the drive ring 40 to the first shell or support shell 16 is preferred. An inner surface 42 of the sintered retainer ring 40 preferably is provided with at least one radially inward-facing, radially extending projection or drive lug 44 and at least one radially inward-facing indentation 46 configured to respectively engage the at least one indentation 28 and/or the at least one projection 29 of the first wearable sealing element 20.

The first shell 16 further is preferably provided with a biasing member 36 which may be operatively connected to the first sealing element 20 to bias the first sealing element 20 towards the second sealing element 22 while still permitting axial displacement of the first sealing element or seal ring 20 toward and away from the sealing element/seal ring 20. The first shell 16 has an axial end wall 21 with a stepped profile wherein a stepped portion 23 of the stepped profile is configured to locate at least an end portion of the biasing member 36. In one embodiment the biasing member 36 is a wave spring.

A spacer 38 may be positioned between the biasing member 36 and the first sealing element 20. The spacer 38 may provide at least one of the functions of spacing, positioning, locating and/or retaining the wave spring 36 relative to the first sealing element 20. The spacer 38 also serves as an O-ring retainer as described below.

The first shell 16 is provided with a first O-ring or other secondary seal 50 having an annular center line CL2 represented by a dotted cross-hair in the center section of the first O-ring 50. In the preferred embodiment the first O-ring 50 is arranged between a portion of the first sealing element 20 and a radially inner portion or inner shell wall 52 of the first shell 16 to prevent coolant fluid, i.e. the fluid being pumped, from leaking there past while still permitting axial travel of the sealing element/seal ring 20. In the preferred embodiment, the first O-ring 50 may be arranged such that the annular center line CL1 of the annular contact surface 32 is radially outwards relative to the annular center line CL2 of the first O-ring 50. The spacer 38 serves to retain the O-ring 50 in the seal ring 20 during axial motion thereof which can occur during assembly of the seal components, installation of the seal 10 in the pump 9, or a vacuum in the application.

The second shell or shaft sleeve 18 is provided with a second O-ring or other secondary seal 54 having an annular center line CL3 represented by a dotted cross-hair in the center section of the second O-ring 54. In the preferred embodiment, the second O-ring 54 is arranged between a portion of the second sealing element 22 and a radially outer portion 56 of the second shell 18 to also prevent leakage of coolant fluid there past. In the preferred embodiment, the second O-ring 54 is arranged such that the annular center line CL1 of the annular contact surface 32 is radially inwards relative to the annular center line CL3 of the second O-ring 54, and in such embodiment, the first and second O-rings 50, 54 are arranged such that the second O-ring 54 is radially outward relative to the first O-ring 50.

The shaft sleeve 18 further includes an upturned lip 57 which turns radially outwardly and is formed after assembly of the above-discussed seal components. The lip 57 projects radially outwardly a sufficient distance so as to prevent axial passage of the support shell 16 out of engagement with the shaft sleeve 18.

In more detail as to the assembly of the components, the support shell 16 has a cup-shaped cross-sectional configuration which receives the biasing spring 36, washer-like spacer 38, O-ring or sealing member 50 and the stationary seal ring 20 which are all slidably received one after the other within the support shell 16. Preferably the drive ring 40 already has been press fit preliminarily into the support shell 16 during assembly as will be described in further detail hereinafter although press fitting of drive ring 40 can occur later. The alignment of the drive lugs 44 and corresponding notches 28 allows the seal ring 20 to be axially displaceable within the support shell 16 while also preventing relative rotation therebetween.

In more detail, the spring 36 first is seated within the support shell 16 adjacent the axial end wall 21 wherein the stepped portion 23 positions the spring 36 in a fixed radial position. The washer-like spacer 38 is then inserted within the interior chamber 58 of the support shell 16 so as to be sandwiched axially between the adjacent end of the spring 36 acting on one side thereof and the back face 20A of the seal ring 20 which acts on the opposite side thereof. This spacer 38 also closes off an annular channel 59 of seal ring 20 in which the O-ring 50 is received. In this manner, the seal ring 20 is axially movable but circumferentially restrained by the drive ring 40. It is noted that at this stage of assembly, these components would be axially removable from the open end of the interior chamber 58 except for the drive ring 40 if already press fit into its fully seated position.

During continuing assembly of the pump seal 10, the second shell or shaft sleeve 18 assembles to the sub-assembly of the support shell 16. In this regard, the shaft sleeve 18 has its own respective annular channel 60 as defined by the outer portion 56 and the sleeve end wall 61. This channel 60 is provided with the second O-ring or sealing member 54 which seats therein, and also receives the second seal ring 22, wherein the seal ring 22 includes an annular notch on the rear corner thereof which accommodates the second O-ring 54. The seal ring 22 on the inner ring diameter 62 thereof has a non-circular shape which conforms to the multi-sided shape defined by the surface arrangement 19 of the second shell or support sleeve 18 so as to prevent rotation of the seal ring 22 relative to the shaft sleeve 18. As will be described further herein, the shaft sleeve 18 in turn is non-rotatably fixed to the shaft 14 so as to rotate therewith wherein the surface arrangement 19 and the correspondence in its shape to the inner ring diameter 62 also causes the seal ring 22 to rotate in unison with the shaft 14.

The shaft sleeve 18 includes an outer wall portion 63 that defines the surface arrangement 19 and is spaced a small distance radially outwardly of the shaft surface 14. Along the axial length of the shaft sleeve 18, the shaft sleeve 18 includes a circumferential step 64 which turns radially inwardly and defines the main wall portion 65 which is dimensioned for tight-fitting, interference-fit engagement with the shaft 14 without the necessity of additional fasteners or the like being provided. In some mechanical seals, fasteners such as setscrews also could be provided, but in the pump seal 10 of the invention as used on smaller-scale applications, the interference-fit engagement of the main wall portion 65 is sufficient so as to prevent axial and circumferential slippage of the shaft sleeve 18 on the shaft 14 after installation.

This main wall portion 65 extends axially and typically is not yet formed with the lip 57 at the time of initial assembly. As such, the lip 57 is not present and would not interfere with insertion of the main wall portion 65 into nested or telescoping engagement with the support shell 16 to the position illustrated in FIG. 1. In this manner, the second rotatable seal ring 22 abuts axially against the first seal ring 20 in which position the lip portion 57 extends axially beyond an inner sleeve wall 66 of the support shell 16. In this rested position, the free end of the main wall portion 65 then is turned radially outwardly by mechanical deformation thereof to form the lip 57 whereby the lip 57 now prevents separation of the shaft sleeve 18 from the support shell 16 which thereby defines an assembly of components which are maintained in this assembled condition prior to installation in the pump bore 13 and on the shaft 14. It can be preferred to form the lip 57 and press fit the drive ring 40 into support shell 16 simultaneously in a single operation, although these steps could be performed at different times. Due to the radial space between the main wall portion 65 and the radially opposed inner shell wall 52, there is some radial play that is permitted between the components to ensure proper alignment of the components to the pump housing 12 and shaft 14.

The support shell 16 also includes a circumferential flange 66 which projects radially outwardly of the outer shell diameter and abuts against the pump housing 12 as seen in FIG. 1 after installation in the pump bore 13.

Figure 2:
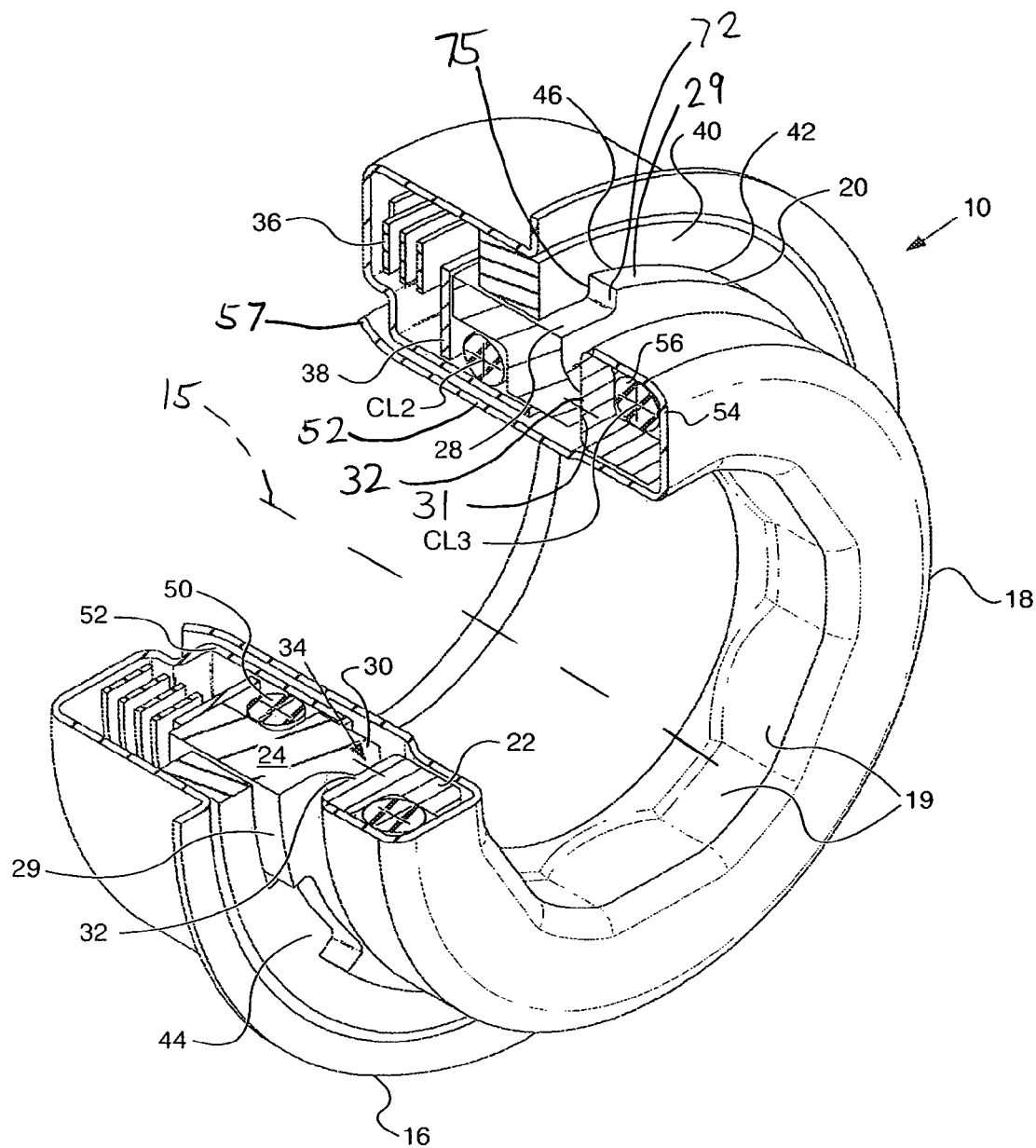
FIG. 2 is an isometric cross-sectioned illustration of the seal of FIG. 1.

Preferably, both the first shell 16 and the second shell 18 are formed from stamped sheet-like metal and in particular, a 304 or a 410 stainless steel or more preferably, a 305 stainless steel, which sheet material is stamped into the cup-like annular shape seen in FIGS. 1 and 2. By forming these components out of a sheet material that is stamped or mechanically deformed, these components have a relatively inexpensive construction which is readily mass-produceable at a cost-effective price.

Referring to FIGS. 3 and 4, the retainer ring or drive ring 40 preferably is formed of sintered powdered metal into the annular shape illustrated in FIG. 3. The formation of the drive ring 40 from sintered metal results in a cost-effective construction which provides the ring 40 in the region of the circumferential indentations 46 with a radial ring thickness that is substantially thicker than the thickness of the outer shell wall 67 which is formed of a stamped sheet metal. The radial thickness of the drive ring 40 is defined by the radial dimension between the outer drive ring diameter 68 and the inner drive ring diameter 69. This radial thickness preferably is several times the thickness of the outer shell wall 67 so as to have a substantially greater radial stiffness than such shell wall 67. The drive lugs 44 project radially inwardly from the inner drive ring diameter 69 to define inner lug surfaces 71, which are generally arcuate, and side lug faces 72 on opposite lug ends to define a circumferential length for each drive lug 44. The circumferential length of such lug 44 is formed so as to accommodate and support the circumferential loads required to maintain the seal ring 20 stationary when the opposite seal ring 22 rotates relative thereto.

While three drive lugs 44 are provided at angularly equi-distant positions, a different number of drive lugs 44 may be provided, such as five or six or other suitable amount, to further distribute drive loads being carried by each individual lug 44 and minimize wear occurring thereon during operation of the coolant pump.

Referring to FIGS. 5 and 6, the stationary seal ring or sealing element 20 is illustrated which has an annular shape formed with the three drive notches or indentations 28 also located at angularly equi-distant locations about the circumference of the seal ring 20. The notches 28 are defined by notch side faces 75 which extend radially inwardly and terminate at the arcuate bottom notch face 77. As seen in FIG. 1, the bottom notch face 77 is spaced radially inwardly of the lug face 71 after assembly so as to provide clearance therebetween. However, as seen in FIG. 2, the notch side faces 75 define a circumferential length for the notch 28 which is closely proximate but slightly larger than the circumferential length of the drive lug 44 so that the notch side faces 75 and lug side faces 72 are disposed closely adjacent with each other and contact each other during shaft rotation but still have sufficient minimal clearance to permit axial movement of the seal ring 20 and biasing of the seal ring 20 towards the opposite seal ring 22 by the biasing member or spring 36. Hence, during shaft rotation, the seal face 32 of the rotatable seal ring 22 is in contact with the seal face 31 of the stationary seal ring 20 which imparts a circumferential force on the seal ring 20 and pulls same circumferentially, at which time the opposed side faces 72 and 75 on one side of the lugs 72 abut in contact with each other and prevent or stop any circumferential movement of the seal ring 20. It is noted that the respective inside and outside corners of lugs 44 and notches 28 each have a radius of curvature which reduces wear and prevents formation of stress concentrations thereat.

Figures 7, 8:
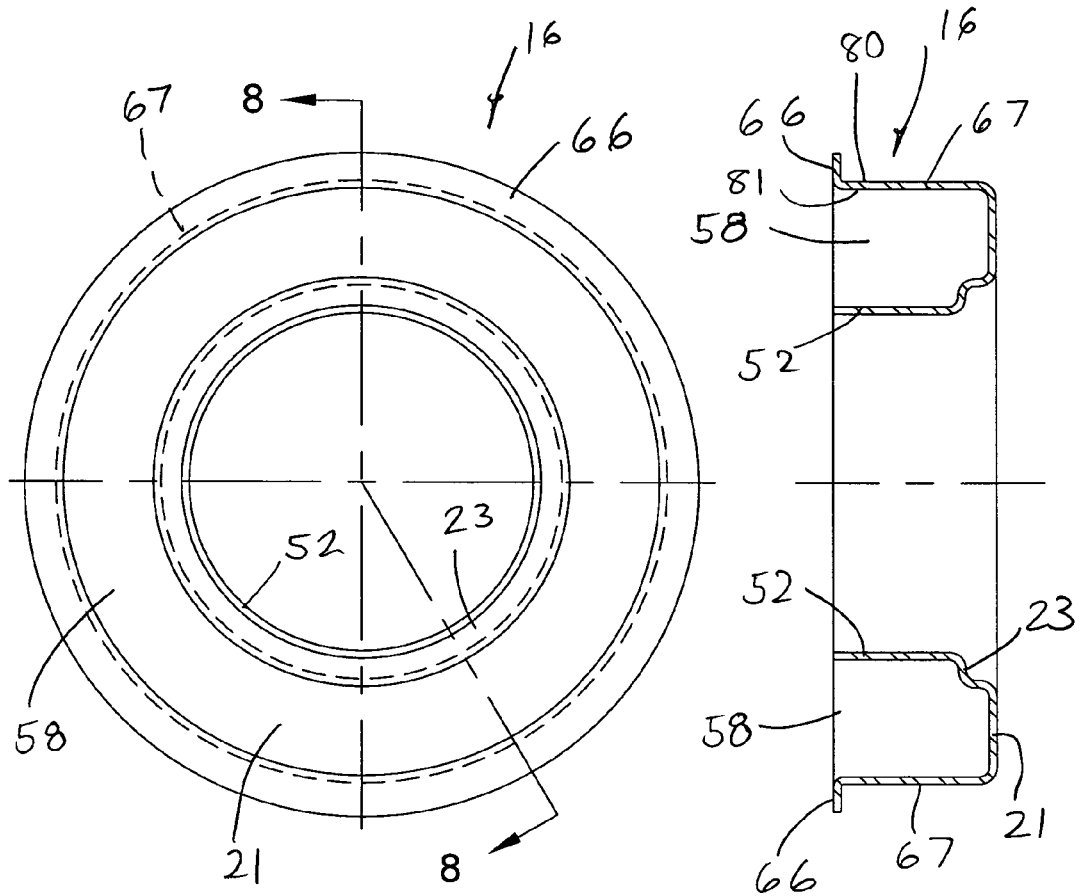
FIG. 7 is an end view of a support shell which is engageable with said drive ring and seal ring of FIGS. 3-6.
FIG. 8 is a side cross-sectional view of the support shell as taken along line 8-8 of FIG. 7.

Referring to FIGS. 7 and 8, the support shell 16 is provided so as to support the components therein as described above. The support shell 16 includes the cup-shaped construction formed in an annular ring that is defined by the inner and outer shell walls 52 and 67, the end wall 21, the stepped wall section 23 and the end flange 66 which projects radially outwardly from the outer shell wall 67. These respective walls define the interior chamber 58 which have an annular shape and opens from one side thereof. With respect to the outer shell wall 67, such shell wall 67 has a radial thickness which generally corresponds to the thin sheet of metal from which the support shell 16 is formed. This radial thickness of the outer shell wall 67 essentially defines an outer shell diameter 80 on one side face thereof and an inner shell diameter 81 on the inside face thereof. Generally, the inside diameter 81 is sufficient so as to receive the drive ring 40 therein and specifically receive the outer drive ring diameter 68 thereof in tight-fitting engagement wherein the drive ring 40 is press fit into the inner chamber 58. The outer shell diameter 81 is selected so as to have a dimension which fits within the inside diameter of the pump bore 13 in tight-fitting, press-fit engagement.

In FIG. 1, the outer shell wall 67 when press fit in the pump bore 13, has a substantially uniform outside diameter along the axial length of the outer shell wall 67 so as to be in continuous circumferential contact with the opposed circumferential surface of the pump bore 13 across the front-to-back axial width of the outer shell wall 67. Due to the tight-fitting engagement therebetween, this engagement thereby defines a fluid seal due to the opposed face contact about the continuous circumference of the pump bore 13 and interfitted support shell 67.

Figures 9, 10:
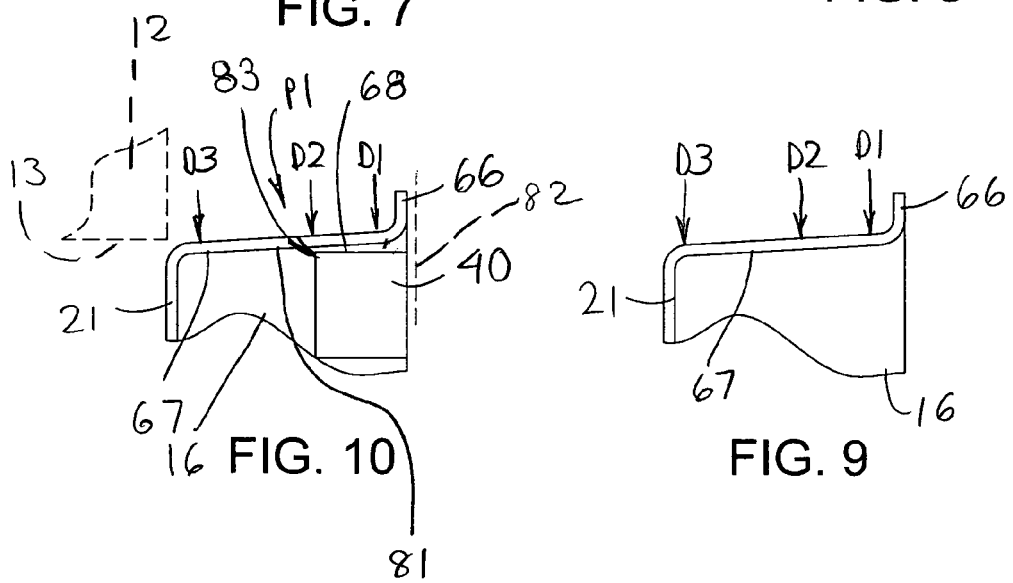
FIG. 9 is an enlarged partial cross-sectional view of the support shell showing a positive taper thereof.
FIG. 10 is a partial view of the support shell of FIG. 9 showing the drive ring press fit therein and diagrammatically illustrating in phantom outline a pump bore as well as a tool for press fitting said drive ring into said support shell.

The outer shell wall 67 further includes a Teflon coating which may partially scrape off during the installation press-fit to ensure uniform contact between the opposed faces. The Teflon coating also functions to reduce friction between the support shell 16 and bore 13 during the installation stage press-fitting of the seal 10 into the bore 13. While FIG. 1 illustrates that the outer shell wall 67 essentially is at a right angle relative to the shell end wall 21, FIGS. 9 and 10 further illustrate that the outer shell wall 67 preferably has a positive taper extending from the open outer end near the flange 66 and tapering radially inwardly towards the shell end wall 21. Essentially, the outer shell wall 67 when not yet assembled, has a largest outer diameter D1 at the open outer end which is slightly larger than the outer diameters D2 and D3, which diameters are axially spaced from diameter D1 along the front-to-back axial width and progressively decrease. This positive taper facilitates press-fit engagement of both the drive ring 40 to the support shell 16 during assembly and also the subsequent press fitting of this assembly into the pump bore 13 during installation.

In more detail, during initial assembly, the drive ring 40 is press fit into the open mouth of the chamber 58 wherein the outside drive ring diameter 68 is able to be inserted during a press-fit operation into the chamber mouth. In this regard, a pressing tool represented by tool face 82 is provided which acts upon the drive ring 14 until such tool face 82 contacts the front face of the flange 66, at which point the respective front faces of the drive ring 40 and flange 66 are essentially coplanar with each other. The inner corner 83 of the drive ring 40 is illustrated so as to be slightly separated from the inside wall face 81 to diagrammatically emphasize that the reverse taper of the shell side wall 67 allows for some gap to form adjacent the mouth of the chamber 58 at Diameter D1, although this inner drive ring corner 83 actually is in direct press-fit contact with the inside wall face 81 proximate diameter D2 after the assembly-stage press-fitting operation. Therefore, the press-fit contact between the drive ring 40 and the shell wall 67 is primarily located in the region of this inner drive ring corner 83 and diameter D2 while the outer shell wall 67 substantially maintains the above-described positive taper. The press-fit contact therebetween maintains the drive ring 40 in a solidly engaged, non-removable position within the support shell 16 and if this press-fit is performed prior to assembly of other seal components, allows for assembly of the additional components described above including the spring biased seal ring 20. The remaining components including the shaft sleeve 18 and its seal ring 22 are then provided and the engagement lip 57 formed so as to pre-assemble the pump seal 10 for subsequent installation into a pump bore 13. However, the press fit may also be performed at the time the lip 57 is formed during a single operation.

While diameter of the pump bore 13 is slightly smaller than the diameter D3, a radiused corner 67A is provided between end wall 21 and outer wall 67 which allows for ready location and initial insertion of the pump seal 10 and specifically, the support shell 16 into the pump bore 13. During this installation operation, the press-fit tool represented by tool face 82 in FIG. 10 would be a tool located at a manufacturing plant or facility for assembling the engines or repairing such engines. The tool face 82 in this installation-stage, press-fitting operation should have a radial dimension which partially overlaps the drive ring 40 and overlaps flange 66 so as to maintain such components in axial alignment during the second press-fit operation by which the pump seal 10 is installed in the pump bore 13. During such press-fit operation, the support shell 16 is continually pressed further into the pump bore 13 wherein the pump bore 13 causes radially inward deformation of the outer shell wall 16 as a result of the progressively increasing diameters defined by outside diameters D3 to D2 to D1. Hence, any radial spacing between the shell wall 67 and drive ring 40 at diameter D1 disappears, and the entire shell wall 67 deforms and conforms to the shape of the pump bore 13 so that the diameters D3, D2 and D1 are equalized and conform to the inside diameter D4 of the pump bore 13 (FIG. 1). Hence, the shell wall 67 is now tightly compressed between the pump bore 13 and the outside diameter 68 of the drive ring 40, wherein such drive ring 40 also undergoes radially inwardly directed compression. Due to the radial thickness of the drive ring 40 which is substantially greater than the shell wall 67, the drive ring 40 provides substantial rigidity and interior radial support to the support wall 67 and also provides for tighter fitting engagement with the pump bore 13 since the shell wall 67 is not able to easily deflect radially inwardly due to the radial support provided by the presence of the drive ring 40. Hence, the first assembly-stage press fit P1 (FIG. 10) provided between drive ring 16 and shell support wall 67 and the second installation-stage press fit P2 (FIG. 1) provides complementary press fits which are located radially adjacent to each other and complement each other in radially supportive relation. While these press fits provide for more secure engagement of the drive ring 40 and hold same in position, the drive ring 40 in turn provides complementary radial support and improves the press fit generated between the support shell 67 and the pump bore 13. These complementary, radially aligned or adjacent press fits P1 and P2 greatly improve the connection of such components and the radial support provided about the entire circumference of the drive ring 40 by the pump bore 13.

Further, this support as generated by these components also reinforces the pump seal 9 against torsional and radial vibrations occurring during rotation of the shaft 14. In particular, the vibrations encountered by the mechanical seal 10 or even by the seal ring 22 transfer to the drive lugs 44 by the opposed lug side faces 72 and notch side faces 75. However, this transfer of vibrational and other operational forces on the lugs 44 in turn is supported directly radially by the pump bore 13 which greatly minimizes the amount of radial and torsional movement which is permitted in the seal rings which further improves the performance of such seal rings 20 and 22. Since such radial and torsional vibration is directly limited and resisted by the pump bore 13 itself, the overall operation of the pump seal 9 is improved compared to known pump seals used in a similar environment.

Furthermore, since the drive ring 40 is located on the wet side of the seal, the coolant fluid is able to flow into the region of the drive lugs 44 and notches 28 which also serves to provide lubrication between the contacting side faces of these components to further assist in reducing wear of such components.

Industrial Applicability

The pump seal 10 may be used in applications such as coolant pumps for internal combustion engines. The coolant pumps typically are engine driven and tend to run many cycles in arduous circumstances. The embodiment of the pump seal 10 as disclosed may provide for prolonged service life at a low owning and operating cost. It may be particularly suitable for pump shafts in the region of about 25 mm or 1 inch diameter and other diameters such as 0.625 inch, 0.75 inch or 12 mm diameters.

During operation the pump seal 10 provides a robust seal between a dry side and a wet side. The pump seal of FIG. 1 preferably is positioned such that the right hand side of the pump seal 10 is that portion that would be the wet side. During rotation of the pump shaft 14 relative to the pump housing 12, the second sealing element 22 rotates relative to the first sealing element 20. A substantially sealing contact surface 30 allows the relative rotation between the first and second sealing elements 20, 22 whilst substantially preventing fluid transfer from the wet to the dry side. Although the sealing elements 20, 22 substantially seal the gap between the pump housing 12 and the pump shaft 14 some fluid may seep through the contact surface 32 formed by the first sealing element 20 and the second sealing element 22. This seepage may be desirable to promote lubrication, cleaning, and/or cooling of the contact surface 22.

The first and second O-rings 40, 54 allow for some movement of the first and second sealing elements 20, 22 respectively whilst preventing or at least substantially reducing any leakage around the first and second sealing elements 20, 22. Movement of the first and second sealing member 20, 22 may be due to vibration and arranging the first and second O-rings 50, 54 at different radial spacings relative to each other and to the center line CL1 of the contact surface 32 may provide good sealing properties whilst enabling a balanced seal between the first and second sealing elements 20, 22 under influence of the biasing member 36.

To cope with vibration and/or to compensate for wear, the biasing member 36 keeps the first and second sealing members 20, 22 in close contact and especially a biasing member 36 in the form of wave spring was found to provide a well-balanced pressure characteristic.

One embodiment of a method of manufacturing of the pump seal 10 is as follows. As the first shell 16 has single pull plane, the first shell 16 can be formed by, for example, a stamping process. The second shell 18 may also be formed via a stamping process. The retainer ring 40 may be formed by, for example, a sintering process. The first shell 16 may be provided with the first sealing element 20, and the retainer ring 40 may be fitted to the first shell 16 via an interference fit, thereby engaging at least the projection and indention arrangement formed by the first sealing arrangement 20 and the retainer ring 40 to substantially prevent rotational movement of the first sealing element 20 relative to first shell 16. It is foreseen that the first sealing element 20 may be provided to the first shell 16 before or after the retainer ring 40 is fitted into the first shell 16. In one embodiment of the manufacturing method, the biasing member 36 is provided in the first shell 16 before the retainer ring 40 is fitted to the first shell 16.

Figure 11:
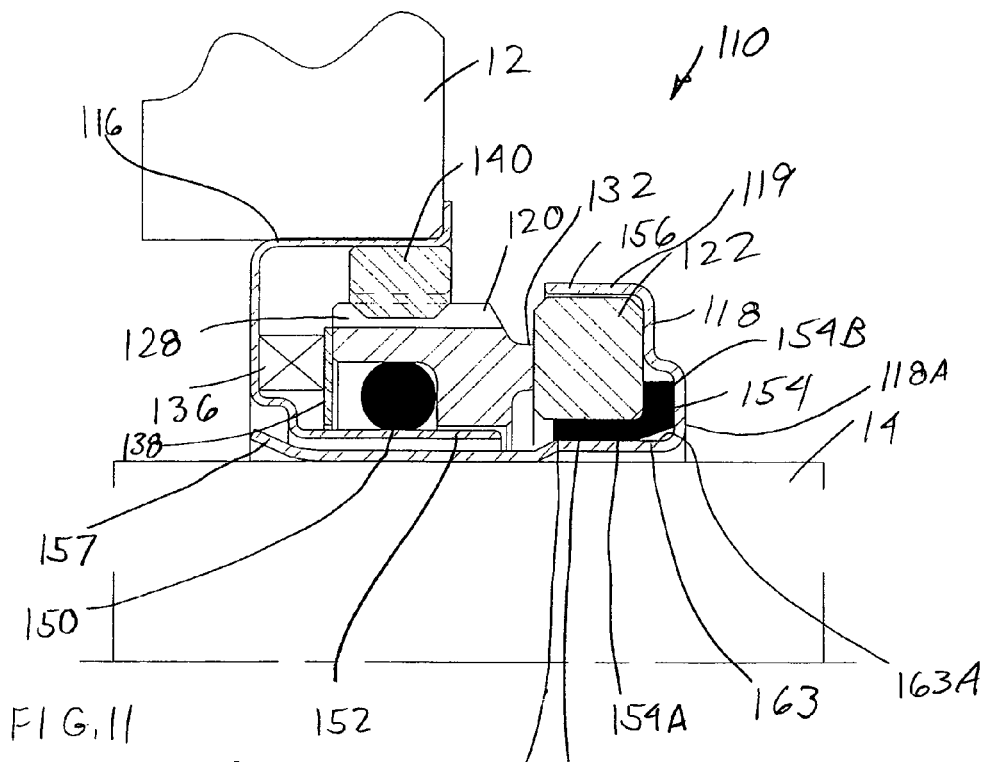
FIG. 11 is a schematic representation of a cross-section of a seal in accordance with a second embodiment of the invention.
Figure 13:
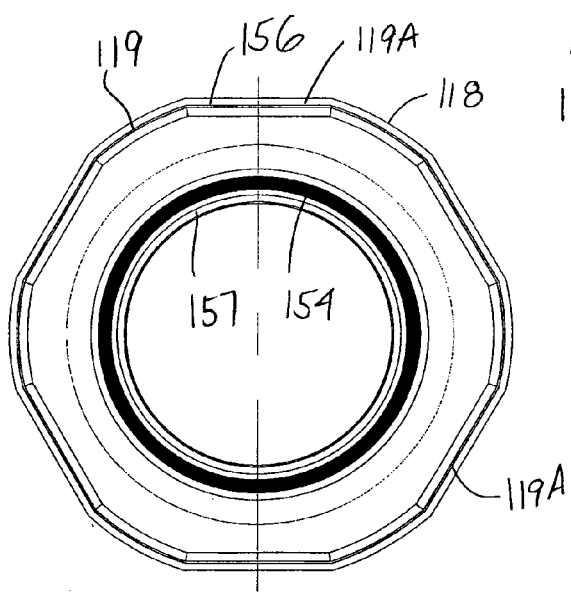
FIG. 13 is an opposite end view of a second shell and seal ring.
Figure 12:
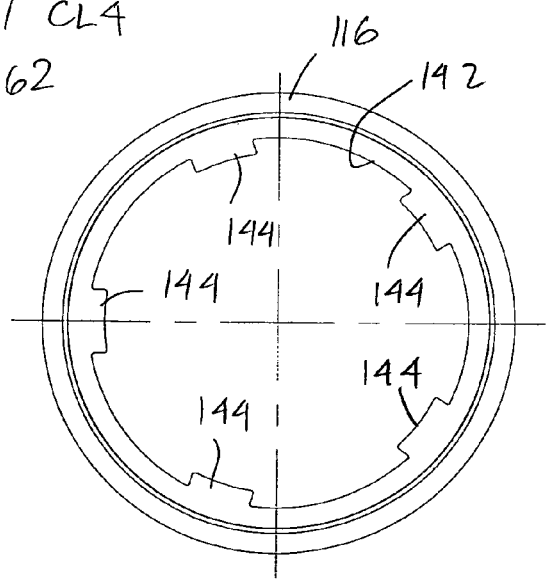
FIG. 12 is an end view of a support shell and drive ring.

Referring to FIGS. 11-13, a second embodiment of a pump seal 110 is illustrated for sealing a gap between the pump housing 12 and pump shaft 14 in a manner similar to the above-described pump seal 10. A detailed description of common components is not required, with the following discussion providing details necessary to understand the primary differences with the above pump seal 10. Common components are identified by the same reference numerals but increased by 100. It will be understood that these common components have essentially the same structures and functions and are assembled the same as that described above.

A first shell 116 serves as a support shell, while the second shell 118 serves as a shaft sleeve. The first and second shells 116 and 118 preferably have annular first and second sealing elements 120 and 122 respectively, formed as annular seal rings. Structurally and functionally, these seal rings 120 and 122 are substantially the same as sealing elements 20, 22 described above. This particular seal design is particularly suited for the same environment as pump seal 10, and particularly may be used on shaft diameters of 0.65 and 0.75 inches or any other similar size.

The first shell 116 is provided with a retainer or drive ring 140 for preventing rotation of the first sealing element 120. The retainer ring 140 preferably is a sintered metallic component which preferably is made from a 410 stainless steel. The retainer ring 40 is engaged with the first shell 16 by an interference and preferably, a press-fit. The inner surface 142 of the retainer ring 40 preferably has five radially inwardly extending projections or drive lugs 144 which respectively engage corresponding indentations or notches 128 in the seal ring 120. The drive lugs 144 are spaced at equal distances about the inside circumference or inside diameter of the drive ring 140.

First shell 116 also is provided with a biasing member or spring 136 which acts on a spacer 138 that in turn acts axially on the seal ring 120. A secondary seal 150 is provided to seal against the seal ring 120 and a radially inner portion or inner shell wall 152.

The second shell 118 is formed with a secondary seal 154 that has an annular shape and an L-shaped cross-section defined by seal legs 154A and 154B that respectively extend axially and radially. The secondary seal 154 is arranged between a portion of the second sealing element 122 and a radially inner portion 163 to prevent leakage of coolant fluid there past. In this embodiment, the centerline of the sealing surfaces 132 is disposed radially upwards relative to an annular contact line CL4 which contacts the inner ring diameter 162. An axial seal leg 154A also contacts an opposing face 163A of the shell wall 163 wherein the seal sections 154A and 154B are preferably compressed between the seal ring 122 and an opposing surface of the second shell 118. The shaft sleeve 118 further includes the upturned lip 157 which turns radially outwardly and is formed after pre-assembly of the above-discussed seal components. The lip 157 projects radially outwardly a sufficient distance so as to prevent axial passage of the support shell 116 out of engagement with the shaft sleeve 118.

To prevent rotation of the seal ring 122 relative to the second support shell 118, the outer shell wall 156 of the second shell 118 preferably is provided with a shaped-surface drive arrangement 119 having multiple drive flats 119A. These flats 119A define a non-circular shape which conforms to a similar multi-sided shape defined on the outer ring diameter of seal ring 122. This prevents the seal ring 122 from rotating relative to the shaft sleeve 118.

Referring to FIG. 11, the support shell 118 also is formed with a pocket 118A which accommodates the radial leg 154B of the secondary seal 154. In this manner, the support shell 118 is provided with a pocket rather than the seal ring such as seal ring 20 which is shown in FIG. 1 with a channel 60 for accommodating the secondary seal when formed as an O-ring 54.

During assembly, the pump seal 110 of FIGS. 11-13 preferably is assembled in a one-step process as described above. Rather than the drive ring 140 preferably being press-fitted first into the support shell 116 before formation of the lip 157, the pump seal 110 preferably has the drive ring 140 preliminarily mounted in the open mouth of the support sleeve 116 with the biasing means 136, washer 138, secondary seal 150 and seal ring 120 also disposed within the support sleeve 116. These components can be loosely fitted together and then the next assembly of the support sleeve 119, seal ring 122 and secondary seal 154 is inserted so that the un-deformed lip 157 prior to bending is inserted through to the assembled position shown in FIG. 11. After this pre-assembly, the pump seal 110 can undergo a forming operation wherein the drive ring 140 is press-fitted to its fully seated position of FIG. 11 at the same time or substantially the same time that the un-deformed lip 157 is deflected radially outwardly to the condition shown in FIG. 11 which seats the drive ring 140 and unitizes the seal components together for later mounting in the pump bore.

Although the preferred embodiments of this disclosure have been described herein, improvements and/or modifications may be incorporated without departing from the scope of the following claims.

What is claimed is:

1. A mechanical seal for mounting between a pump bore of a pump and a rotatable shaft extending axially therethrough, said mechanical seal comprising:

a thin-walled, metal support shell having an annular outer shell wall defining an outer shell surface configured for a press fit into the pump bore and an inner shell surface defining an interior chamber which opens axially from an open end of said outer shell wall, said outer shell wall having a wall portion with a radial wall thickness defined between said outer and inner shell surfaces and a radial shell diameter defined relative to a pump bore such that press fitting engagement of said wall portion of said support shell with a pump bore smaller than said radial shell diameter effects limited radial distortion of the outer shell wall radially inwardly upon axial pressing of the support shell into the pump bore, said wall portion defining a maximum radial dimension for said radial shell diameter and said inner shell surface defining an inner shell circumference which is circumferentially continuous, said outer shell wall having a metal radial flange at said open end which projects radially outwardly of said radial shell diameter and defines a flange face which faces axially;

a stationary seal ring which has an annular shape and is mounted in stationary engagement with said support shell;

a drive ring which has an annular shape having a radial ring thickness defined by an outer ring surface and an inner ring surface and having an axial length defined between opposite, axially-facing ring end faces wherein said radial ring thickness is thicker than said radial wall thickness along said axial length and defines a radial stiffness of said drive ring along said axial length which has a greater rigidity than said outer shell wall, said drive ring being inserted with an interference fit into said interior chamber of said support shell in fixed non-movable engagement therewith wherein an outer one of said ring end faces is substantially coplanar with said flange end face, and said outer ring surface is in substantially continuous contact with said inner shell surface along said inner shell circumference, said inner ring surface and said stationary seal ring being interfitted in said fixed non-movable engagement to prevent circumferential movement of said stationary drive ring relative to said support shell, said drive ring being disposed directly radially inwardly of said wall portion to be subjected to said limited radial distortion of said outer shell wall by a pump bore and said greater rigidity providing radial support to said support shell along said axial length and about said inner shell circumference when said support shell is press fit into a pump bore; and a rotatable seal ring supportable on a rotating shaft by a shaft sleeve, wherein said stationary and rotatable seal rings have opposed seal faces which are disposed in sealing engagement with each other.

2. A mechanical seal according to claim 1, wherein said drive ring and said seal ring include a drive arrangement comprising radially-projecting drive lugs and radially-opening notches which interfit together.

3. A mechanical seal according to claim 2, wherein said drive lugs and notches permit axial movement of said stationary seal ring relative to said drive ring and said support shell.

4. A mechanical seal according to claim 1, wherein said drive ring is press fit within said support shell until said ring end face is flush with said flange face.

5. A mechanical seal according to claim 1, wherein said outer ring surface is separated radially from said inner shell surface along a portion of said axial length prior to being press fit into a pump bore and said outer ring surface and said inner shell surface are dimensioned so as to be disposed in radial contact after being press fit into a pump bore.

6. A mechanical seal for mounting between a pump bore of a pump and a rotatable shaft extending axially therethrough, said mechanical seal comprising:

a support shell having an annular outer shell wall defining an outer shell surface configured for a press fit into the pump bore and an inner shell surface defining an interior chamber, said inner shell surface defining an inner shell circumference and an inner shell diameter, and said outer shell wall having a thin wall portion with an outer radial diameter dimensioned relative to a pump bore such that press fitting engagement of said thin wall portion of said support shell with a pump bore smaller than said outer radial diameter effects limited radial distortion of the outer shell wall radially inwardly upon axial pressing of the support shell into the pump bore;

a stationary seal ring which has an annular shape and is mounted in stationary engagement with said support shell;

a drive ring which has an annular shape having a radial thickness defined by an outer ring surface and an inner ring surface wherein said outer and inner ring surfaces extend along an axial length of said drive ring which said axial length is defined between opposite axially-facing end faces at opposite ends of said drive ring, said radial thickness along said axial length being thicker than said thin wall portion of said support shell and defining a radial stiffness of said drive ring across said axial length which has a greater rigidity than said outer shell wall, said drive ring being inserted with an interference fit into said interior chamber of said support shell in fixed non-movable engagement with said inner shell surface wherein said outer ring surface is in substantially continuous contact with said inner shell surface along said inner shell circumference to provide radial support to said thin wall portion substantially continuously about said inner shell circumference, and said inner ring surface and said stationary seal ring being interfitted in said fixed non-movable engagement to prevent circumferential movement of said stationary drive ring relative to said support shell; and a rotatable seal ring supportable on a rotating shaft by a shaft sleeve, wherein said stationary and rotatable seal rings have opposed seal faces which are disposed in sealing engagement with each other;

said drive ring being a shaped metal ring having said radial thickness which is greater than a radial thickness of said outer shell wall of the support shell along said axial length so as to have a greater rigidity relative thereto, said drive ring being disposed directly radially inwardly of said thin wall portion to be subjected to said limited radial distortion of said outer shell wall by a pump bore and providing said radial support to said outer shell wall along said axial length and about said inner shell circumference when press fit within a pump bore;

said support shell having a positive taper such that said support shell flares radially outwardly from an inner shell end to an open outer shell end wherein said drive ring is press fit through said outer shell end, the magnitude of the outer radial diameter and the inner radial diameter of said support shell progressively increasing from said inner shell end to said outer shell end wherein said drive ring has an outer ring diameter which is smaller than said inner radial diameter at said outer shell end and is greater than said inner radial diameter at the inner shell end, said drive ring being in press fit engagement with said support shell with an inner end portion being in fixed engagement with said inner shell surface while an outer end portion of said drive ring is spaced radially inwardly of said outer shell wall.

7. A mechanical seal according to claim 6, wherein said drive ring is made of sintered metal.

8. A mechanical seal according to claim 6, wherein said support shell when press fit into a pump bore during subsequent installation effects radially inward deformation of said support shell against said drive ring to define two complementary, radially adjacent press fits which fixedly secure said support shell within a pump bore and fixedly secures said drive ring to said support shell.

9. A mechanical seal for mounting between a pump bore of a pump and a rotatable shaft extending axially therethrough, said mechanical seal comprising:

a support shell having an annular outer shell wall defining an outer shell surface configured for a press fit into the pump bore and an inner shell surface defining an interior chamber, said outer shell wall having a wall portion;

a stationary seal ring which has an annular shape and is mounted in stationary engagement with said support shell;

a drive ring which has an annular shape having a radial thickness defined by an outer ring surface and an inner ring surface wherein said radial thickness defines a radial stiffness of said drive ring which has a greater rigidity than said outer shell wall, said drive ring being inserted with a press fit into said interior chamber of said support shell in fixed non-movable engagement therewith wherein said outer ring surface is in substantially continuous circumferential contact with said inner shell surface, and said inner ring surface and said stationary seal ring being interfitted in said fixed non-movable engagement to prevent circumferential movement of said stationary drive ring relative to said support shell, said drive ring being disposed directly radially inwardly of said wall portion; and a rotatable seal ring supportable on a rotating shaft by a shaft sleeve, wherein said stationary and rotatable seal rings have opposed seal faces which are disposed in sealing engagement with each other;

said support shell having a positive taper wherein said support shell flares radially outwardly from an inner shell end to an open outer shell end wherein the magnitude of each of the outer radial diameter and the inner radial diameter progressively increases from said inner shell end to said outer shell end, said drive ring being press fit through said outer shell end and having an inner ring end disposed in contact with said inner shell surface before installation in a pump bore and having an opposite, outer ring end disposed proximate said outer shell end, said drive ring having an outer ring diameter defined by said outer ring surface which is smaller than said inner radial diameter at said outer shell end and is greater than said inner radial diameter at said inner shell end, said drive ring being press fit into said support shell with an inner drive portion defined by said inner ring end being in fixed engagement therewith while an outer end portion of said drive ring defined by said outer ring end is spaced radially inwardly of said outer shell wall before being press fit into a pump bore, said support shell being dimensioned such that press fitting of said outer shell wall into a pump bore during subsequent installation effects radially inward deformation of said support shell against said drive ring to define two complementary, radially adjacent press fits which fixedly secure said support shell within a pump bore and fixedly secures said drive ring to said support shell.

10. A mechanical seal according to claim 9, wherein said outer ring surface is separated radially from said inner shell surface along a portion of an axial length of said drive ring prior to being press fit into a pump bore and said outer ring surface and said inner shell surface are dimensioned so as to be disposed in radial contact after being press fit into a pump bore.

11. A mechanical seal for mounting between a pump bore of a pump and a rotatable shaft extending axially therethrough, said mechanical seal comprising:

a support shell having an annular outer shell wall defining an outer shell surface configured for a press fit into the pump bore and an inner shell surface defining an interior chamber and an inner radial diameter, said outer shell wall having a wall portion with an outer radial diameter defined relative to a pump bore such that press fitting engagement of said wall portion of said support shell with a pump bore smaller than said outer radial diameter effects limited radial distortion of the outer shell wall radially inwardly upon axial pressing of the support shell into the pump bore, said inner shell surface defining an inner shell circumference;

a stationary seal ring which has an annular shape and is mounted in stationary engagement with said support shell;

a drive ring which has an annular shape having a radial thickness defined by an outer ring surface and an inner ring surface wherein said radial thickness defines a radial stiffness of said drive ring which has a greater rigidity than said outer shell wall, said drive ring being inserted with an interference fit into said interior chamber of said support shell in fixed non-movable engagement therewith, and said inner ring surface and said stationary seal ring being interfitted in said fixed non-movable engagement wherein press fit contact is present between said outer ring surface and said inner shell surface substantially continuously along said inner shell circumference to prevent circumferential movement of said stationary drive ring relative to said support shell, said drive ring being disposed directly radially inwardly of said wall portion to be subjected to said limited radial distortion of said outer shell wall by a pump bore; and a rotatable seal ring supportable on a rotating shaft by a shaft sleeve, wherein said stationary and rotatable seal rings have opposed seal faces which are disposed in sealing engagement with each other;

said support shell having a positive taper wherein said support shell flares radially outwardly from an inner shell end to an open outer shell end wherein the magnitude of each of the outer radial diameter and the inner radial diameter progressively increases from said inner shell end to said outer shell end, said drive ring being press fit through said outer shell end and having an inner ring end disposed in contact with said inner shell surface before installation in a pump bore and having an opposite, outer ring end disposed proximate said outer shell end, said drive ring having an outer ring diameter which is smaller than said inner radial diameter at said outer shell end and is greater than said inner radial diameter at said inner shell end, said drive ring being press fit into said support shell with an inner drive portion defined by said inner ring end being in fixed engagement therewith while an outer end portion of said drive ring defined by said outer ring end is spaced radially inwardly of said outer shell wall before being press fit into a pump bore wherein said inner shell surface proximate said outer shell end is spaced radially outwardly of said outer ring surface before installation in a pump bore and being dimensioned to as to be in radially directed contact with said outer shell end after press fit engagement within a pump bore.

* * * * *